No. 660,410. Patented Oct. 23, 1900.
G. BECKER.
LOCK FOR VEHICLE WHEELS.
(Application filed May 2, 1900.)
(No Model.)
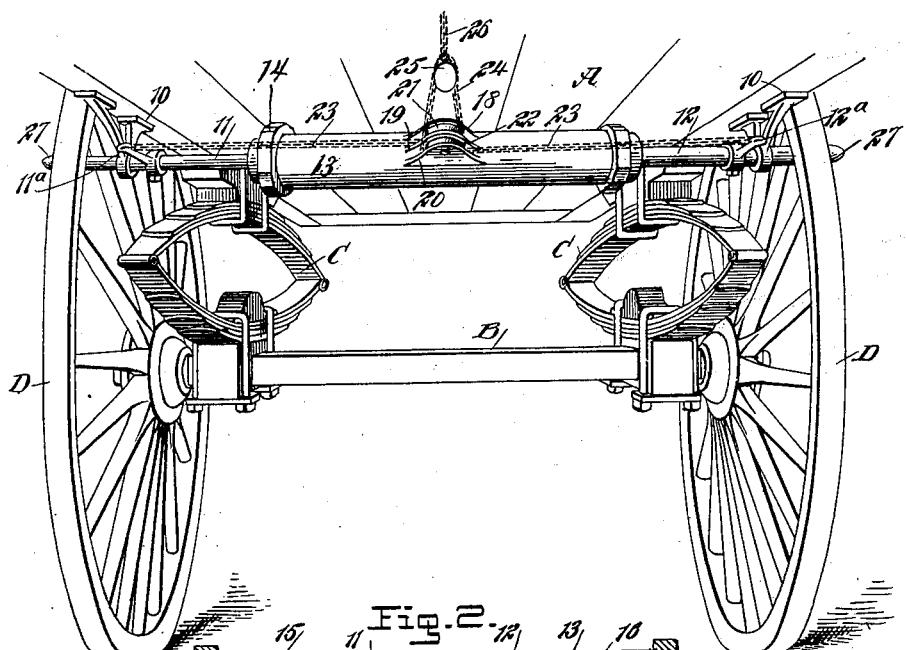
WITNESSES:
INVENTOR
George Becker.
BY
ATTORNEYS

UNITED STATES PATENT OFFICE.

GEORGE BECKER, OF NEW YORK, N. Y.

LOCK FOR VEHICLE-WHEELS.

SPECIFICATION forming part of Letters Patent No. 660,410, dated October 23, 1900.

Application filed May 2, 1900. Serial No. 15,198. (No model.)

*To all whom it may concern:*

Be it known that I, GEORGE BECKER, a citizen of the United States, and a resident of the city of New York, borough of Manhattan, in the county and State of New York, have invented a new and Improved Lock for Vehicle-Wheels, of which the following is a full, clear, and exact description.

One purpose of the invention is to provide simple mechanism capable of being attached to any vehicle, and especially adapted to lock the front and rear wheels of a vehicle and to be under convenient reach and control of the driver.

Another purpose of the invention is to so construct a locking mechanism for vehicles that the extremities of locking-bars may be simultaneously made to enter the spaces between spokes in corresponding wheels, thus serving to check a runaway team, lock the wheels in descending steep hills, or lock the wheels when the vehicle is to be left standing, and, further, to so construct the locking mechanism that it may be normally held out of engagement with the wheels.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the rear portion of the running-gear of a vehicle and a portion of the bottom of the body, illustrating the improved locking mechanism applied and in perspective. Fig. 2 is a longitudinal section through the cylinder of the locking mechanism, the view being drawn on an enlarged scale; and Fig. 3 is a vertical transverse section through the rear axle of the running-gear and one of the locking-bars and a longitudinal section through a portion of the body of the vehicle.

A represents the bottom of a vehicle-body, which is connected by springs C or in any other approved manner with an axle B, the axle illustrated being the rear axle of a vehicle, and this rear axle is supported by suitable ground-wheels D. Brackets 10 are secured to the bottom A of the vehicle-body at the sides thereof and at a point preferably in front of the rear axle B. Locking-bars 11 and 12 are mounted to slide in the brackets or hangers 10, and these locking-bars 11 and 12 are telescopic, as shown in Fig. 2, being adapted to slide one within the other in a cylinder 13, closed by suitable caps 14. The locking-bars 11 and 12 have sliding movement in the ends or caps 14 of the cylinder, and within the cylinder 13 the locking-bar 11 is provided with an attached disk 15, and the opposing locking-bar 12 carries a corresponding disk 16. A spring 17 is coiled around the telescoping portions of the two locking-bars 11 and 12, which spring has bearing against the inner or opposing faces of the disks 15 and 16. The spring 17 acts to force the locking-bars 11 and 12 in opposite directions, and when the spring 17 is free to act it causes the outer extremities of the locking-bars 11 and 12 to enter spaces between the spokes of the wheels D, thus locking the wheels or preventing them from turning.

Three projections 18, 19, and 20 are formed one above the other on the front face of the cylinder 13, preferably at a point centrally between its ends, and peripherally-grooved pulleys or friction-wheels 21 and 22 are located between these projections, one above the other, as is especially shown in Fig. 3. Arms 11$^a$ and 12$^a$ are forwardly projected respectively from the locking-bars 11 and 12, the arms 11$^a$ and 12$^a$ being secured to their respective locking-bars in a rigid manner, and the ends of a chain 23 or its equivalent are attached to the free extremities of the arms 11$^a$ and 12$^a$, and this chain is made to pass in contact with the pulleys 21 and 22, as shown in Figs. 1 and 3, a loop 24 being formed in the chain in front of the said pulleys, and this loop portion of the chain is passed around a pulley in a block 25, which block is attached by a chain 26 to a winding shaft or drum, to be turned by a lever or equivalent means within easy reach of the driver's seat. When the chain 26 is drawn forward, the locking-bars 11 and 12 are made to telescope to their greatest extent within the cylinder 13, carrying the ends of the said locking-bars out of engagement with the wheels D. When, however, it is desired to lock the wheel, the chain 26 is relieved from tension, whereupon the spring 17 in the cylinder 13 will act and will force the locking-bars 11 and 12 outward in opposite directions to such an extent that the outer ends of these locking-bars will enter spaces between the spokes of corresponding wheels supporting the axle adjacent to which the mechanism is located.

In order that the outer ends of the locking-bars 11 and 12 shall not mar the finish of the wheel, as these outer ends of the bars are adapted to engage with the inner surfaces of the rims of the wheels, the said outer ends of the locking-bars 11 and 12 are capped with rubber or other soft material 27. Thus it will be observed that through the medium of a mechanism constructed substantially as described the wheels of a vehicle may be locked, should the team attempt to run away, or when the vehicle is descending a steep decline, or is to stand for any length of time in a position to make such lock desirable.

Having thus described my invention, I claim as new and desire to secure by Letters Patent—

1. A lock for vehicle-wheels, consisting of a cylinder, locking-bars having sliding movement in the cylinder and extending beyond the ends of said cylinder, means within the cylinder, for normally forcing the locking-bars outward in opposite directions, and means for drawing the locking-bars in direction of each other, as described.

2. A locking device for vehicle-wheels, consisting of telescopic locking devices adapted to enter spaces between the spokes of a wheel, a spring exerting outward pressure on the locking devices, and a mechanism, substantially as described, for controlling the movement of the said locking devices.

3. A lock for vehicle-wheels, consisting of a cylinder, locking-bars which extend through and slide in the ends of the cylinder, the inner ends of the locking-bars having a telescopic connection, offsets located on the said locking-bars within the cylinder, a spring exerting outward pressure on the said offsets, and means for drawing the locking-bars in direction of each other, as set forth.

4. In a lock for vehicle-wheels, a cylinder, locking-bars having sliding movement in the ends of said cylinder and extending beyond said ends, the inner ends of the locking-bars having telescopic connection, a spring exerting pressure on the locking-bars in an outward direction, arms connected with the locking-bars, pulleys supported upon the exterior of the cylinder, a chain or like device attached to the said arms and passed around the said pulleys, the chain having a loop formed in its central portion adjacent to the pulleys, and a roller-bearing for the loop portion of the chain, as described.

In testimony whereof I have signed my name to this specification in presence of two subscribing witnesses.

GEORGE BECKER.

Witnesses:
J. FRED. ACKER,
JNO. M. RITTER.